US 7,181,115 B2

(12) United States Patent
Aikawa et al.

(10) Patent No.: US 7,181,115 B2
(45) Date of Patent: Feb. 20, 2007

(54) DISPERSION COMPENSATING FIBER MODULE, AND OPTICAL FIBER TRANSMISSION LINE

(75) Inventors: Kazuhiko Aikawa, Sakura (JP); Ryuji Suzuki, Sakura (JP); Kuniharu Himeno, Sakura (JP)

(73) Assignee: Fujikura Ltd., Tokyo (JP)

( * ) Notice: Subject to any disclaimer, the term of this patent is extended or adjusted under 35 U.S.C. 154(b) by 0 days.

(21) Appl. No.: 11/072,533

(22) Filed: Mar. 7, 2005

(65) Prior Publication Data

US 2005/0201700 A1    Sep. 15, 2005

(30) Foreign Application Priority Data

Mar. 9, 2004  (JP)  .............................. 2004-065843

(51) Int. Cl.
*G02B 6/02*  (2006.01)
*G02B 6/36*  (2006.01)

(52) U.S. Cl. ....................................... 385/123; 385/127

(58) Field of Classification Search ..................... None
See application file for complete search history.

(56) References Cited

U.S. PATENT DOCUMENTS

| | | | |
|---|---|---|---|
| 5,361,319 A | 11/1994 | Antos et al. | |
| 6,009,221 A | 12/1999 | Tsuda | |
| 6,263,138 B1 | 7/2001 | Sillard et al. | |
| 6,445,864 B2 | 9/2002 | Jiang et al. | |
| 6,493,494 B1 | 12/2002 | Rousseau et al. | |
| 6,498,887 B1 | 12/2002 | Gruner-Nielson et al. | |
| 6,501,892 B1 | 12/2002 | Okuno et al. | |
| 6,510,268 B1 | 1/2003 | de Montmorillon et al. | |
| 6,546,178 B2 | 4/2003 | Jiang et al. | |
| 6,643,438 B1 | 11/2003 | Sillard et al. | |

(Continued)

FOREIGN PATENT DOCUMENTS

EP    1241494 A2    9/2002

(Continued)

OTHER PUBLICATIONS

Kazuhiko Aikawa et al., "High Performance Wide-Band Dispersion Compensating Fiber Module for Non-Zero Dispersion Shifted Optical Fiber", Technology Report of the Institute for Electronics, Information and Communication Engineers, Apr. 2002, p. 35.

*Primary Examiner*—Michelle Connelly-Cushwa
*Assistant Examiner*—Chris H. Chu
(74) *Attorney, Agent, or Firm*—Sughrue Mion, PLLC

(57) ABSTRACT

A dispersion compensating fiber module which, when connected to an optical fiber which exhibits, at a wavelength of 1.55 µm, a chromatic dispersion of between +2 and +6 ps/nm/km, a dispersion slope of between +0.075 ps/nm$^2$/km and +0.095 ps/nm$^2$/pm, and a relative dispersion slope of between 0.016 nm$^{-1}$ and 0.024 nm$^{-1}$, performs compensation so that the residual dispersion of the connected optical fiber is reduced, the dispersion compensating fiber module includes a dispersion compensating fiber and at least one optical fiber fused to the dispersion compensating fiber, in which the dispersion compensating fiber module exhibits at a wavelength of 1.55 µm, a relative dispersion slope of between 0.016 nm$^{-1}$ and 0.026 nm$^{-1}$; and in a wavelength range between 1.525 µm and 1.565 µm, a maximum residual dispersion difference, when converted per km of the transmission optical fiber, of less than or equal to 0.4 ps/nm/km.

11 Claims, 8 Drawing Sheets

U.S. PATENT DOCUMENTS

| | | | |
|---|---|---|---|
| 2003/0095769 A1* | 5/2003 | Aikawa et al. | 385/127 |
| 2003/0147612 A1 | 8/2003 | Jiang et al. | |
| 2004/0017988 A1* | 1/2004 | Honma et al. | 385/127 |
| 2005/0013571 A1* | 1/2005 | Wood | 385/127 |
| 2005/0249471 A1* | 11/2005 | Aikawa et al. | 385/128 |

FOREIGN PATENT DOCUMENTS

| | | |
|---|---|---|
| EP | 1246380 A2 | 10/2002 |
| EP | 1308756 A1 | 5/2003 |
| JP | 2002-221632 A | 8/2002 |
| WO | WO 01/71391 A2 | 9/2001 |

* cited by examiner

DISPERSION COMPENSATING FIBER MODULE, AND OPTICAL FIBER TRANSMISSION LINE

CROSS-REFERENCE TO RELATED APPLICATION

This application is based upon and claims the benefit of priority from Japanese Patent Application No. 2004-65843, filed Mar. 9, 2004, the disclosure of which is incorporated herein in its entirety by reference.

BACKGROUND OF THE INVENTION

1. Field of the Invention

The invention relates to a dispersion compensating fiber module which is used for compensating the accumulated chromatic dispersion of a non-zero dispersion shifted optical fiber (NZ-DSF) which has chromatic dispersion of several ps/nm/km in the C-band (wavelength between 1.525 μm and 1.565 μm) and in the L-band (wavelength between 1.565 μm and 1.625 μm). More particularly, the invention relates to a dispersion compensating fiber module which is capable of suppressing residual dispersion to a low level, and to an optical fiber transmission line which is fabricated by connecting such a module to a transmission optical fiber.

2. Description of Related Art

In order to increase the transmission capacity of wavelength division multiplexing (hereinafter referred to as "WDM"), it is effective to increase the transmission rate for each channel by broadening the operating wavelength range. The relationship between the transmission rate and the residual dispersion is shown in FIG. 1. In order to increase the transmission rate, it is necessary to reduce the accumulated dispersion over the transmission line. In contrast to the case with 2.5 Gbit/sec transmission in which the allowable residual dispersion is about 16,000 ps/nm, with 10 Gbit/sec transmission it is about 1,000 ps/nm, and with 40 Gbit/sec transmission it is about 65 ps/nm. Thus, as the transmission rate is increased, the allowable residual dispersion become smaller. Due to this, when attempts are made to increase the transmission distance and to increase the transmission rate, dispersion compensation for each span becomes indispensable. Since such dispersion compensation is required over the entire operating wavelength range, it also becomes necessary to compensate the accumulated dispersion slope of the transmission line at the same time.

Numerous studies have already been reported regarding slope compensating and dispersion compensating fibers (SC-DCFs) for standard single-mode optical fibers (S-SMFs) (for example, refer to Japanese Unexamined Patent Application, First Publication No. H06-11620 and Japanese Unexamined Patent Application, First Publication No. 2002-221632).

Furthermore, similarly, SC-DCFs for NZ-DSFs have been reported which almost entirely compensate accumulated dispersion in a wide band (for example, refer to "High performance wide-band dispersion compensating fiber module for non-zero dispersion shifted optical fiber" by Kazuhiko Aikawa et al., Technology Report of the Institute for Electronics, Information and Communication Engineers, OCS 2002-7, April 2002, pp. 35–40).

FIG. 2 is a schematic diagram illustrating the basic concept of compensation for chromatic dispersion upon an optical fiber transmission line. A transmission optical fiber typically has a chromatic dispersion and a dispersion slope in both positive values. Therefore, it is possible to compensate the dispersion in a wide wavelength range by connecting an SC-DCF which has a negative chromatic dispersion and a negative dispersion slope having an appropriate length (i.e., a length in which the dispersion can be cancelled) with the ratio of the chromatic dispersion and the dispersion slope being appropriately adjusted. With actual transmission optical fibers and SC-DCFs, wavelength dependence in the dispersion slope is observed. In other words, the dispersion characteristic is a curved line, rather than such a linear line. Although the wavelength dependence of the dispersion slope of the transmission optical fiber is small as compared to that of the SC-DCF, the wavelength dependence of the SC-DCF is still comparatively large. In particular, in an SC-DCF, the greater the relative dispersion slope (RDS) with respect to the chromatic dispersion, the greater the wavelength dependence of the dispersion slope becomes.

FIGS. 3 and 4 are graphs showing examples of the residual dispersion characteristics when lengths of 80 km of various types of NZ-DSF, which are described in the above-described paper by Aikawa, have been dispersion compensated. In FIG. 3, the residual dispersion characteristic after a low dispersion slope type NZ-DSF has been compensated with an SC-DCF module is shown. In both of the C-band (wavelengths between 1.525 μm and 1.565 μm) and the L-band (wavelengths between 1.565 μm and 1.625 μm), the residual dispersion is less than or equal to ±5 ps/nm, and thus, it is possible to compensate the residual dispersion so that it is reduced over the entire wavelength range. This is because the curvature of the dispersion curve is small since the RDS of the SC-DCF is not particularly large. However, with the residual dispersion characteristic when a large effective area NZ-DSF shown in FIG. 4 has been compensated with an SC-DCF module, a relatively large residual dispersion of ±20 ps/nm remains in the C-band, and ±15 ps/nm in the L-band. This is because the curvature of the dispersion curve is large since the RDS of the SC-DCF is large. These values are both for a transmission optical fiber having a length of 80 km, when the residual dispersion are converted into lengths per km, they become less than or equal to ±0.25 ps/nm/km (the maximum residual dispersion difference is 0.5 ps/nm/km), and less than or equal to ±0.19 ps/nm/km (the maximum residual dispersion difference is 0.38 ps/nm/km). Since, in a long haul transmission, such residual dispersion accumulates in the similar manner, this entails a deterioration of transmission quality when dispersion compensation at each wavelength is not performed.

An SC-DCF has a refractive index profile as, for example, shown in FIG. 5. By adjusting the delta (Δ) and the ratio of the radii of the respective layers of this refractive index profile, it becomes possible to adjust the various types of optical property, including the RDS. In a range where the RDS is small, the design for this adjustment of the RDS and fabrication of such fibers can be achieved comparatively easily. However, when, for an SC-DCF having the RDS exceeds 0.01 nm$^{-1}$, an attempt is made to maintain the bending loss and the cutoff wavelength and the like while making the absolute value of the chromatic dispersion great, the design and the fabrication become difficult, and furthermore the dispersion curve easily becomes severely curved.

SUMMARY OF THE INVENTION

The invention has been made in the light of the above identified problems, and it takes as one object to provide an SC-DCF module which is capable of compensating for the accumulated chromatic dispersion of an NZ-DSF in the C-band or the L-band, thus extending the transmission distance of a long haul transmission line, and an optical fiber transmission line which includes this SC-DCF module.

In order to achieve such an object, one aspect of the invention provides an SC-DCF module which, when connected to an optical fiber which exhibits, at a wavelength of 1.55 µm, a chromatic dispersion of between +2 and +6 ps/nm/km, a dispersion slope of between +0.075 ps/nm$^2$/km and +0.095 ps/nm$^2$/km, and an RDS of between 0.016 nm$^{-1}$ and 0.024 nm$^{-1}$, performs compensation so that the residual dispersion of the connected optical fiber is reduced, the SC-DCF module including an SC-DCF and at least one optical fiber fused to the dispersion compensating fiber, wherein the SC-DCF module exhibits at a wavelength of 1.55 µm, an RDS of between 0.016 nm$^{-1}$ and 0.026 nm$^{-1}$; in a wavelength range between 1.525 µm and 1.565 µm, a maximum residual dispersion difference, when converted per km of the transmission optical fiber, of less than or equal to 0.4 ps/nm/km.

Furthermore, in the above-described SC-DCF modules, the SC-DCF exhibits, at a wavelength of 1.55 µm, a chromatic dispersion and a dispersion slope of negative values, and an RDS of between 0.006 nm$^{-1}$ and 0.016 nm$^{-1}$; and the optical fiber exhibits, at a wavelength of 1.55 µm, a chromatic dispersion and a dispersion slope of positive values, and an RDS of between 0.0028 nm$^{-1}$ and 0.0036 nm$^{-1}$.

Moreover, in either of the above-described SC-DCF modules, a total length of the fibers in an SC-DCF module and a dispersion compensated fiber per −100 ps/nm may be less than or equal to 40 km Moreover, in the above-described SC-DCF module, a reel is further provided and the SC-DCF is wound about the reel.

Furthermore, in order to achieve the above-described object, another aspect of the invention provides an SC-DCF module which, when connected to an optical fiber which exhibits, at a wavelength of 1.59 µm, a chromatic dispersion of between +6 and +10 ps/nm/km, a dispersion slope of between +0.075 ps/nm$^2$/km and +0.095 ps/nm$^2$/km, and an RDS of between 0.008 nm$^{-1}$ and 0.014 nm$^{-1}$, performs compensation so that the residual dispersion of the connected optical fiber is reduced, the SC-DCF module includes an SC-DCF and at least one optical fiber fused to the dispersion compensating fiber, wherein the SC-DCF module exhibits at a wavelength of 1.59 µm, an RDS of between 0.008 nm$^{-1}$ and 0.014 nm$^{-1}$; in a wavelength range between 1.565 µm and 1.625 µm, a maximum residual dispersion difference, when converted per km of the transmission optical fiber, of less than or equal to 0.3 ps/nm/km.

Furthermore, in the above-described SC-DCF module, the SC-DCF exhibits, at a wavelength of 1.59 µm, a chromatic dispersion and a dispersion slope of negative values, and an RDS of between 0.005 nm$^{-1}$ and 0.01 nm$^{-1}$; and the optical fiber exhibits, at a wavelength of 1.59 µm, a chromatic dispersion and a dispersion slope of positive values, and an RDS of between 0.0026 nm$^{-1}$ and 0.0034 nm$^{-1}$.

Moreover, in the above-described SC-DCF module of another aspect, a total length of the fibers in the SC-DCF module per −100 ps/nm may be less than or equal to 30 km.

Moreover, in the above-described SC-DCF module, a reel is included and the SC-DCF is wound about the reel.

Furthermore, in any of the above-described SC-DCF modules, when the SC-DCF module is used as a Raman amplifying medium, the SC-DCF which exhibits, at a wavelength of 1.55 µm band or 1.59 µm band, a chromatic dispersion and a dispersion slope of negative values may be disposed at the Raman excitation optical input side within the SC-DCF module.

Furthermore, in order to achieve the above-described object, yet another aspect of the invention provides an optical fiber transmission line, including any of the above-described SC-DCF modules, and a transmission optical fiber which is connected to this SC-DCF module.

Furthermore, the SC-DCF module of the invention, when connected to an optical fiber which exhibits, at a wavelength of 1.55 µm, a chromatic dispersion of between +2 and +6 ps/nm/km, a dispersion slope of between +0.075 ps/nm$^2$/km and +0.095 ps/nm$^2$/km, and an RDS of between 0.016 nm$^{-1}$ and 0.024 nm$^{-1}$, performs compensation so that the residual dispersion of the connected optical fiber is reduced, the SC-DCF module exhibits, at a wavelength of 1.55 µm, an RDS of between 0.016 nm$^{-1}$ and 0.026 nm$^{-1}$; in a wavelength range between 1.525 µm and 1.565 µm, a maximum residual dispersion difference, when converted per km of the transmission optical fiber, of less than or equal to 0.4 ps/nm/km. Accordingly, the transmission distance of a long haul transmission line, for which the residual dispersion is the limiting factor, is extended, and it is possible to eliminate any supplementary dispersion compensating units.

Furthermore, the SC-DCF module of the invention, when connected to an optical fiber which exhibits, at a wavelength of 1.59 µm, a chromatic dispersion of between +6 ps/nm/km and +10 ps/nm/km, a dispersion slope of between +0.075 ps/nm$^2$/km and +0.095 ps/nm$^2$/km, and an RDS of between 0.008 nm$^{-1}$ and 0.014 nm$^{-1}$, performs compensation so that the residual dispersion of the connected optical fiber is reduced, and the SC-DCF module exhibits, at a wavelength of 1.59 µm, an RDS of between 0.008 nm$^{-1}$ and 0.014 nm$^{-1}$; in a wavelength range between 1.565 µm and 1.625 µm, a maximum residual dispersion difference, when converted per km of the transmission optical fiber, of less than or equal to 0.3 ps/nm/km. Accordingly, the transmission distance of a long haul transmission line, for which the residual dispersion is the limiting factor, is extended, and it is possible to eliminate any supplementary dispersion compensating units.

Yet further, since, in this optical fiber transmission line, there is connected to the transmission optical fiber an SC-DCF module whose residual dispersion is smaller than is the case when a conventional SC-DCF module is used, accordingly, as compared to the case when a conventional SC-DCF module is used, it is possible to make the transmission distance longer, and/or to eliminate a supplementary dispersion compensating unit, so that it is possible to reduce cost.

BRIEF DESCRIPTION OF THE DRAWINGS

The above and other objects, features and advantages of the invention will become more apparent by describing in detail the exemplary embodiments with reference to the attached drawings in which.

DETAILED DESCRIPTION OF THE INVENTION

Exemplary embodiments of the invention will now be described below by reference to the attached Figures. The described exemplary embodiments are intended to assist the understanding of the invention, and are not intended to limit the scope of the invention in any way.

First Exemplary Embodiment

Figure 12:
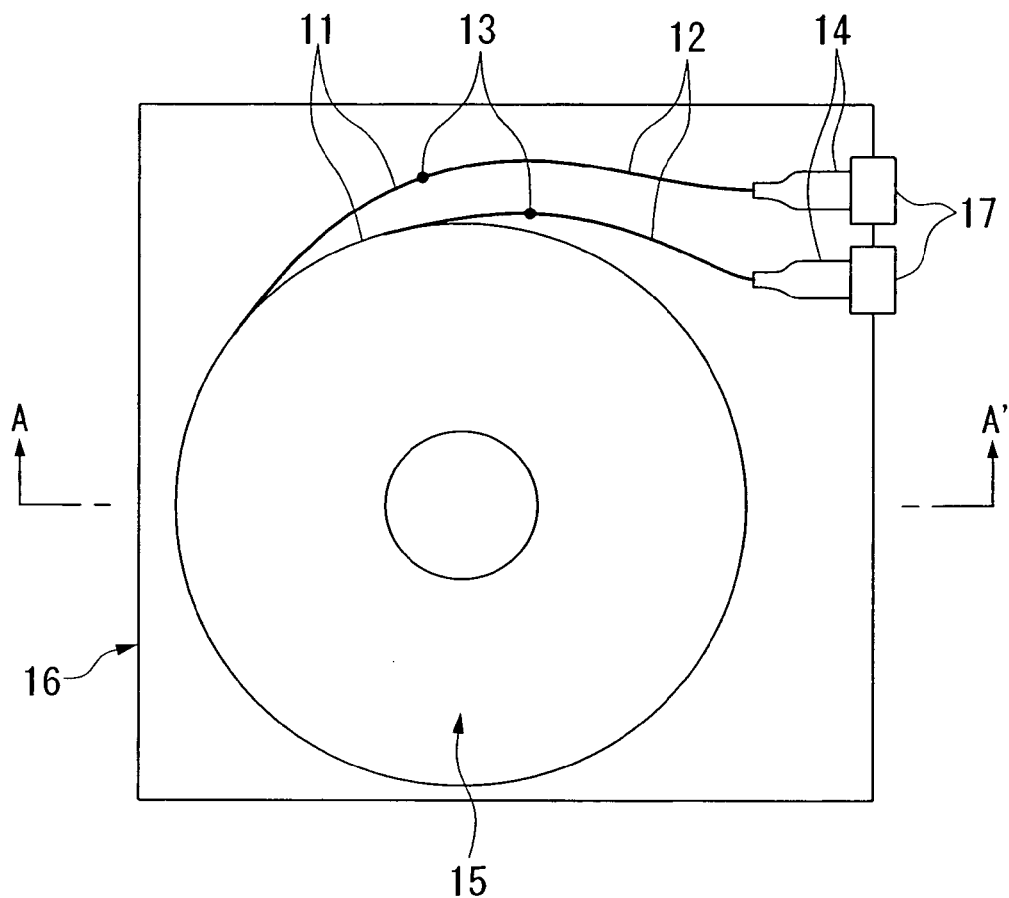
FIG. 12 is a schematic inner view illustrating the SC-DCF module of a first exemplary embodiment of the invention.
Figure 13:
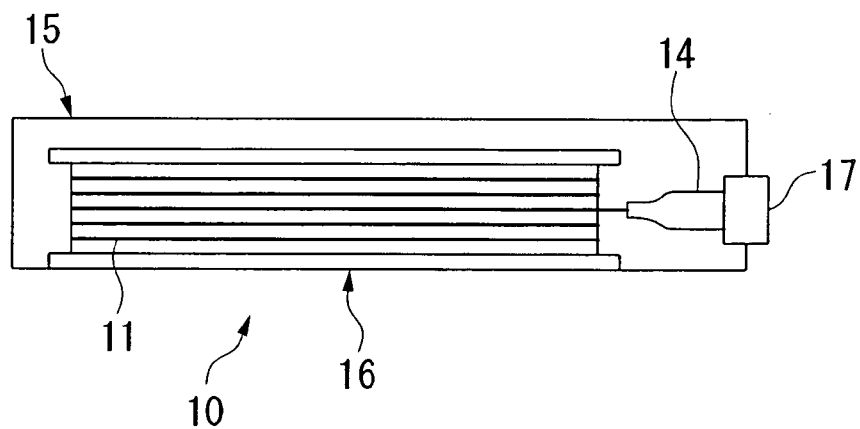
FIG. 13 is a cross-sectional view taken along line A—A' in FIG. 12.

A first exemplary embodiment of the invention is a dispersion compensating fiber (SC-DCF) module. FIG. 12 is a schematic inner view illustrating the SC-DCF module of the first exemplary embodiment of the present invention. FIG. 13 is a cross-sectional view taken along line A–A' in FIG. 12. The SC-DCF module 10 may include an SC-DCF 11, two single-mode fibers 12 (for example, a 1.3 µm zero dispersion single-mode fiber), a reel 15, and a casing 16. The SC-DCF 11 may be wound about the reel 15 (for example, an aluminum reel), and may be sandwiched between the single-mode fibers 12 via fused splicing portions 13. A connector 14 may be provided to an end of each of the single-mode fibers 12 for connecting SC-DCF module 10 to transmission optical fibers or the like. Optionally, adaptors may be provided and may be interposed between one of the connectors 14 and connectors of fibers that are to be connected to the module 10. The adaptors typically are connected to the casing 16. In this SC-DCF module 10, the length of the SC-DCF 11 is determined according to the amount of compensation to be achieved. Note that the SC-DCF module of the invention is not limited to this configuration.

When this SC-DCF module is connected to an optical fiber which exhibits, at a wavelength of 1.55 µm, a chromatic dispersion of between +2 ps/nm/km and +6 ps/nm/km, a dispersion slope of between +0.075 ps/nm$^2$/km and +0.095 ps/nm$^2$/km, and an RDS of between 0.016 nm$^{-1}$ and 0.024 nm$^{-1}$. The SC-DCF module performs compensation so that the residual dispersion of the connected optical fiber is reduced. The module exhibits, at a wavelength of 1.55 µm, an RDS of between 0.016 nm$^{-1}$ and 0.026 nm$^{-1}$, and, in a wavelength range between 1.525 µm and 1.565 µm (C-band), exhibits a maximum residual dispersion difference, when converted per km of the transmission optical fiber, of less than or equal to 0.4 ps/nm/km. As used herein, the term "maximum residual dispersion difference" refers to the difference between the maximum residual dispersion and the minimum residual dispersion in the above-described wavelength range.

Figure 5:
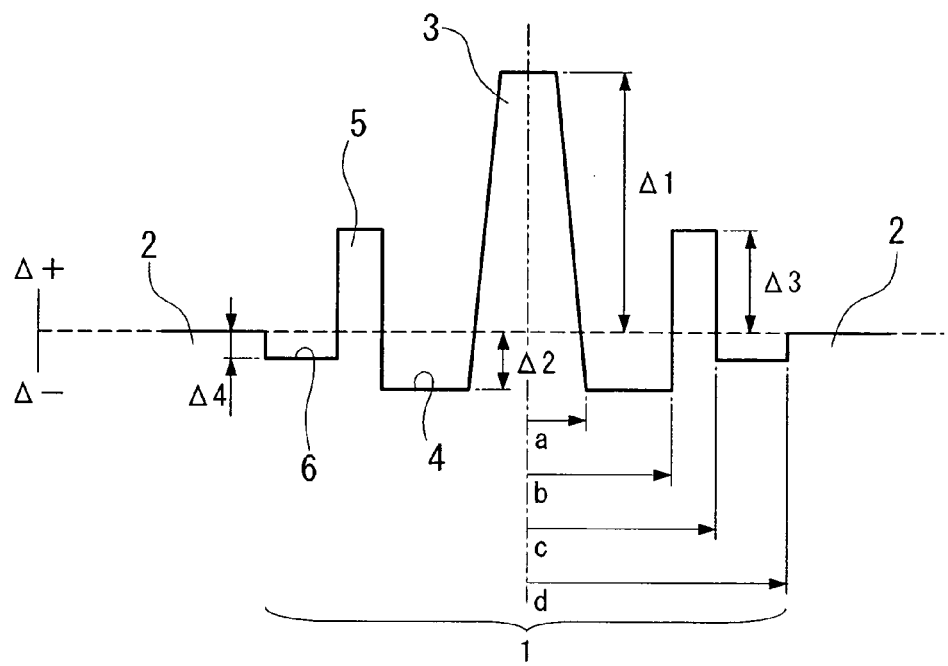
FIG. 5 is a schematic diagram showing an example of a cross sectional refractive index profile of an SC-DCF.

The SC-DCF module of this exemplary embodiment may be fabricated by using an SC-DCF which has a refractive index profile as shown in FIG. 5. This SC-DCF includes a core 1 and a cladding 2. The core 1 includes a central core region 3 which has a refractive index which is greater than the refractive index of the cladding 2; a depressed core region 4 which is provided around this central core region 3 and which has a refractive index which is smaller than the refractive index of the cladding 2; a ring core region 5 which is provided around this depressed core region 4 and which has a refractive index which is greater than the refractive index of the cladding 2; and a depressed cladding region 6 which is provided around this ring core region 5 and which has a refractive index which is smaller than the refractive index of the cladding 2. The cladding 2 is provided around the depressed cladding region 6.

Since, for the SC-DCF module of this exemplary embodiment of the invention, its maximum residual dispersion difference in the C-band, converted into a value per km of the transmission optical fiber, is less than or equal to 0.4 ps/nm/km, which is less than the residual dispersion of when a conventional SC-DCF module is used. Accordingly, the transmission distance of a long haul transmission line, for which the residual dispersion is the limiting factor, is extended, and it is possible to reduce the number of additional dispersion compensating units.

Second Exemplary Embodiment

A second exemplary embodiment of the invention is an SC-DCF module that includes an SC-DCF that exhibits, at a wavelength of 1.55 µm, a chromatic dispersion and a dispersion slope of negative values, and an RDS of between 0.006 nm$^{-1}$ and 0.016 nm$^{-1}$; and an optical fiber which exhibits, at a wavelength of 1.55 µm, a chromatic dispersion and a dispersion slope of positive values, and an RDS of between 0.0028 nm$^{-1}$ and 0.0036 nm$^{-1}$.

This SC-DCF module provides similar advantageous effects, as the first exemplary embodiment described above.

Third Exemplary Embodiment

A third exemplary embodiment of the invention is an SC-DCF module of the first exemplary or second exemplary embodiment described above, in which the total length of the fibers in the SC-DCF module per −100 ps/nm is less than or equal to 40 km.

Here, the total length of the fibers in the SC-DCF module per −100 ps/nm, $L_{Total}$, is defined by the following formulae:

$$D_{DCF} \times L_{DCF} + D_{SMF} \times L_{SMF} = -100 \text{ (ps/nm)}$$

$$L_{Total} = L_{DCF} + L_{SMF}$$

where $L_{DCF}$ is the length of the SC-DCF (km), $L_{SMF}$ is the length of the S-SMF(km), $D_{DCF}$ is the chromatic dispersion of the SC-DCF (ps/nm/km), and $D_{SMF}$ is the chromatic dispersion of the S-SMF (ps/nm/km).

When the total length of the fibers per −100 ps/nm is greater than 40 km, the size of the casing for this SC-DCF module becomes greater than that of conventional ones, which is undesirable, since it entails increase of cost and the like. It is thus desirable for the total length of the fibers per −100 ps/nm to be less than or equal to 40 km, although it depends on the amount of compensation, since it is possible to house this SC-DCF module in a casing of size which is comparable to that of a conventional SC-DCF module. It should be understood that the size of such a casing for a conventional SC-DCF module is, for example, about 224 mm×235 mm×45 mm.

Fourth Exemplary Embodiment

A fourth exemplary embodiment of the invention is an SC-DCF module. This compensating fiber module has a similar structure as the SC-DCF module of the first exemplary embodiment shown in FIG. 12. When this SC-DCF module is connected to an optical fiber which exhibits, at a wavelength of 1.59 μm, a chromatic dispersion of between +6 ps/nm/km and +10 ps/nm/km, a dispersion slope of between +0.075 ps/nm²/km and 0.095 ps/nm²/km, and an RDS of between 0.008 nm$^{-1}$ and 0.014 nm$^{-1}$, the dispersion fiber module performs compensation so that the residual dispersion of the connected optical fiber is reduced. The SC-DCF module exhibits, at a wavelength of 1.59 μm, an RDS of between 0.008 nm$^{-1}$ and 0.014 nm$^{-1}$, and, in a wavelength range between 1.565 μm and 1.625 μm (L-band), a maximum residual dispersion difference, when converted per km of the transmission optical fiber, of less than or equal to 0.3 ps/nm/km.

Since, for the SC-DCF module of this fourth exemplary embodiment of the invention, its maximum residual dispersion difference in the L-band (the wavelengths between 1.565 μm and 1.625 μm), converted into a value per km of the transmission optical fiber, is less than or equal to 0.3 ps/nm/km, which is less than the residual dispersion of when a conventional SC-DCF module is used. Accordingly, the transmission distance of a long haul transmission line, for which the residual dispersion is the limiting factor, is extended, and it is possible to reduce the number of additional dispersion compensating units.

Fifth Exemplary Embodiment

A fifth exemplary embodiment of the invention is an SC-DCF module that includes an SC-DCF which exhibits, at a wavelength of 1.59 μm, a chromatic dispersion and a dispersion slope of negative values, and an RDS of between 0.005 nm$^{-1}$ and 0.01 nm$^{-1}$; and an optical fiber which exhibits, at a wavelength of 1.59 μm, a chromatic dispersion and a dispersion slope of positive values, and an RDS of between 0.0026 nm$^{-1}$ and 0.0034 nm$^{-1}$.

This SC-DCF module provides similar advantageous effects, as the fourth exemplary embodiment described above.

Sixth Exemplary Embodiment

A sixth exemplary embodiment of the invention is an SC-DCF module of the fourth exemplary or the fifth exemplary embodiment described above, in which the total length of the fibers in the SC-DCF module per −100 ps/nm is less than or equal to 30 km.

When the total length of the fibers per −100 ps/nm is greater than 30 km, the size of the casing for this SC-DCF module becomes greater than that of conventional ones, which is undesirable, since it entails increase of cost and the like. It is thus desirable for the total length of the fibers per −100 ps/nm to be less than or equal to 30 km, although it depends on the amount of compensation, since it is possible to house this SC-DCF module in a casing of size which is comparable to that of a conventional SC-DCF module. In particular, since the accumulated chromatic dispersion of a transmission line in a wavelength range between 1.565 μm and 1.625 μm is greater than in a wavelength range between 1.525 μm and 1.565 μm, accordingly the amount of dispersion compensation which is required becomes greater. Due to this, for the same dispersion compensation amount, it is desirable for a total length of fiber which is used for the wavelength range between 1.565 μm and 1.625 μm to be shorter, than a fiber which is used for the wavelength range between 1.525 μm and 1.565 μm.

Seventh Exemplary Embodiment

A seventh exemplary embodiment of the invention is an SC-DCF module of the above-described first through sixth exemplary embodiments described above. When this SC-DCF module is used as a Raman amplifying medium, the SC-DCF which exhibits, at a wavelength of 1.55 μm band or 1.59 μm band, a chromatic dispersion and a dispersion slope of negative values is disposed at the Raman excitation optical input side within the SC-DCF module.

With the SC-DCF module of this seventh exemplary embodiment, it is possible to obtain Raman gain effectively by disposing the SC-DCF which has smaller effective area ($A_{eff}$) and a larger non-linear refractive index ($n_2$) at the excitation optical input end at the optical excitation input power is high, as compared to an optical fiber which exhibits a chromatic dispersion and a dispersion slope of positive values.

Eighth Exemplary Embodiment

An eighth exemplary embodiment of the invention is an optical fiber transmission line, including an SC-DCF module according to the invention as described above, and a transmission optical fiber which is connected to the above-described SC-DCF modules.

Figure 14:
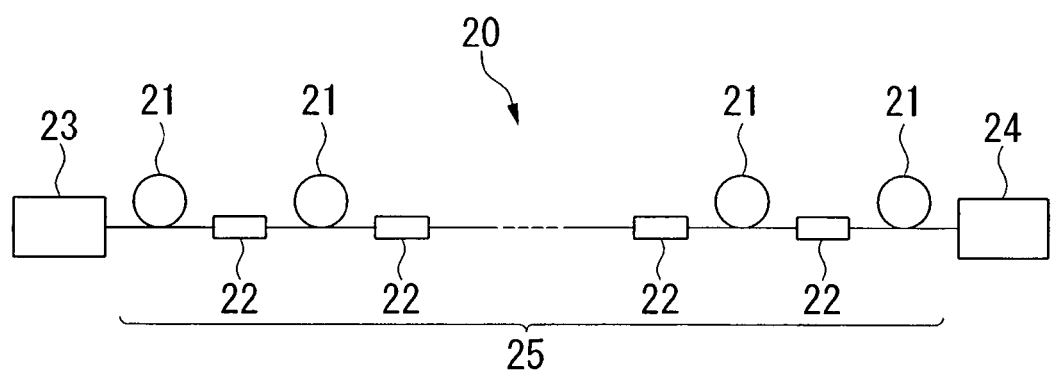
FIG. 14 is a schematic diagram of a first exemplary embodiment of an optical transmission system.

FIG. 14 is a schematic diagram of a first exemplary embodiment of an optical transmission system 20. In FIG. 14, reference numeral 21 indicates a transmission optical fiber, and a dispersion compensating fiber module 22 may be connected to every span of this transmission optical fiber 21. One set of an optical transmission line span may be formed by this transmission optical fiber 21 and the dispersion compensating fiber module 22, and the optical transmission line 25 of the exemplary embodiment may be formed by connecting this set of an optical transmission span in at least one stage. A transmitter 23 and a receiver 24 may be connected by the optical transmission line 25 to form an optical transmission system 20.

Figure 15:
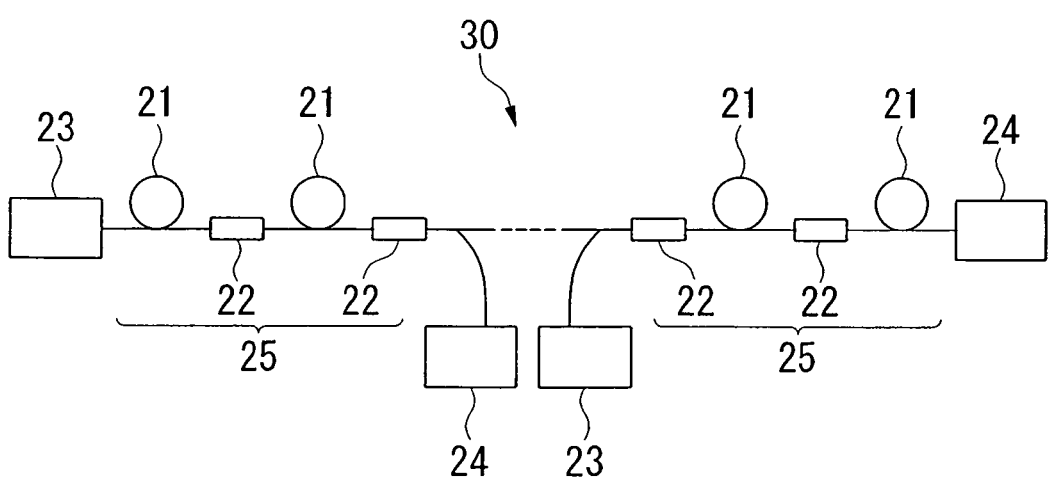
FIG. 15 is a schematic diagram of a second exemplary embodiment of an optical transmission system.

FIG. 15 is a schematic diagram of second exemplary embodiment of optical transmission system 30. In FIG. 15 as well, reference numeral 21 represents a transmission optical fiber, and a dispersion compensating fiber module 22 may be connected to every span of this transmission optical fiber 21. One set of a transmission line span may be formed by this transmission optical fiber 21 and the dispersion compensating fiber module 22, and this one set of transmission line span may be connected in at least one stage to form the optical transmission line 25 of the exemplary embodiment.

In this example as well, although the transmitter 23 and the receiver 24 are connected to this optical transmission line 25 to form an optical transmission system 30, in the optical transmission system 30 of this example, the optical signal may be received with the receiver 24 by extracting the optical signal at an intermediate transmission line span, or the transmitter 23 may be provided at an intermediate point, and the optical signal is sent out from this transmitter 23. Note that the optical transmission line of the invention is not limited to these configurations.

Since, in this optical fiber transmission line, an SC-DCF module is connected whose residual dispersion is smaller than is the case when a conventional SC-DCF module is used, accordingly, as compared to the case when a conventional SC-DCF module is used, it is possible to make the transmission distance longer, or to eliminate an additional dispersion compensating unit, so that it is possible to reduce cost.

The absolute value of the maximum residual dispersion in these bands was 20 ps/nm.

If, for example, the residual dispersion tolerance which is allowable for 40 Gbit/sec transmission is assumed to be 65 ps/nm, there remains a wavelength range for which dispersion compensation was required every 260 km. Due to this, the number of times of dispersion compensation is increased, and the structure of the optical fiber transmission line becomes complicated, which is not desirable.

TABLE 1

| No | Δ1 [%] | Δ2 [%] | Δ3 [%] | Δ4 [%] | b/a | c/b | d/c | d [μm] |
|---|---|---|---|---|---|---|---|---|
| Fiber A | 1.89 | −1.20 | 0.46 | −0.05 | 2.5 | 1.4 | 1.6 | 12.0 |

TABLE 2

| No | λ [μm] | CD[1] [ps/nm/km] | Trans. Loss [dB/km] | DS[2] [ps/nm²/km] | FOM[3] [ps/nm/dB] | RDS [nm⁻¹] | $A_{eff}$ [μm²] | Bending Loss [dB/m, 2R = 20 mm] | PMD[4] [ps/√km] |
|---|---|---|---|---|---|---|---|---|---|
| Fiber A | 1.55 | −77 | 0.60 | −1.6 | 128 | 0.020 | 12 | 2.1 | 0.11 |

[1]CD: chromatic dispersion,
[2]DS: Dispersion slope,
[3]FOM: figure of merit, and
[4]PMD: polarization mode dispersion

EXAMPLES

Comparative Example 1

An SC-DCF A (hereinafter simply referred to as "Fiber A") having a refractive index profile as shown in FIG. 5 was fabricated by the vapor phase axial deposition (VAD) method or the modified chemical vapor deposition (MCVD) method or the like. Fiber A was fabricated so that Δ1, Δ2, Δ3, Δ4, b/a, c/b, d/c, and the core radius "d" had the values listed in Table 1.

Figure 6:
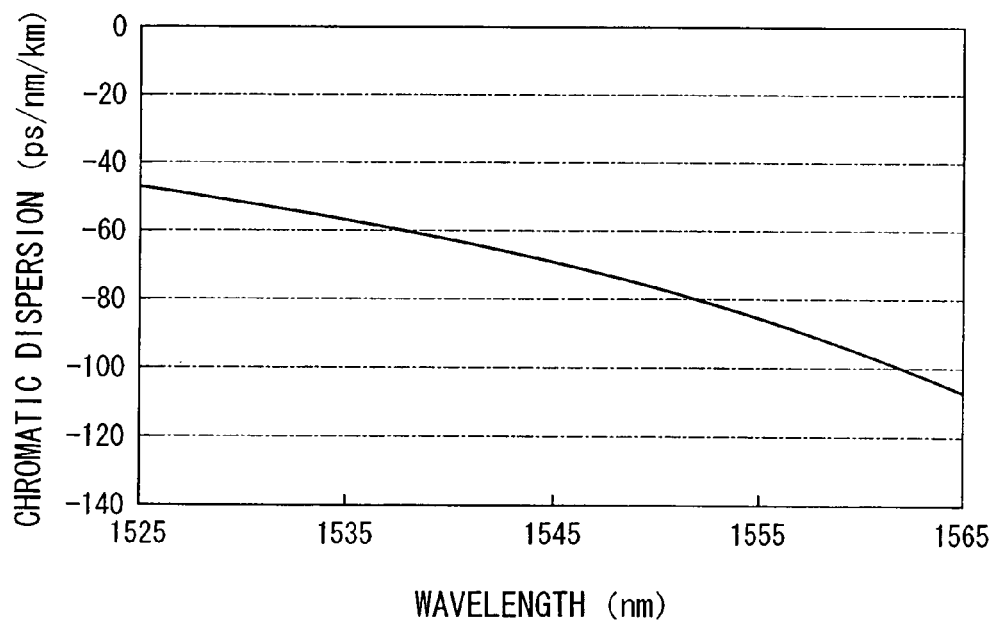
FIG. 6 is a graph showing the chromatic dispersion characteristic of a fiber A which is used in an exemplary embodiment of the invention.

The optical properties of Fiber A are listed in Table 2. Furthermore, the chromatic dispersion characteristic of Fiber A is shown in FIG. 6.

Figure 1:
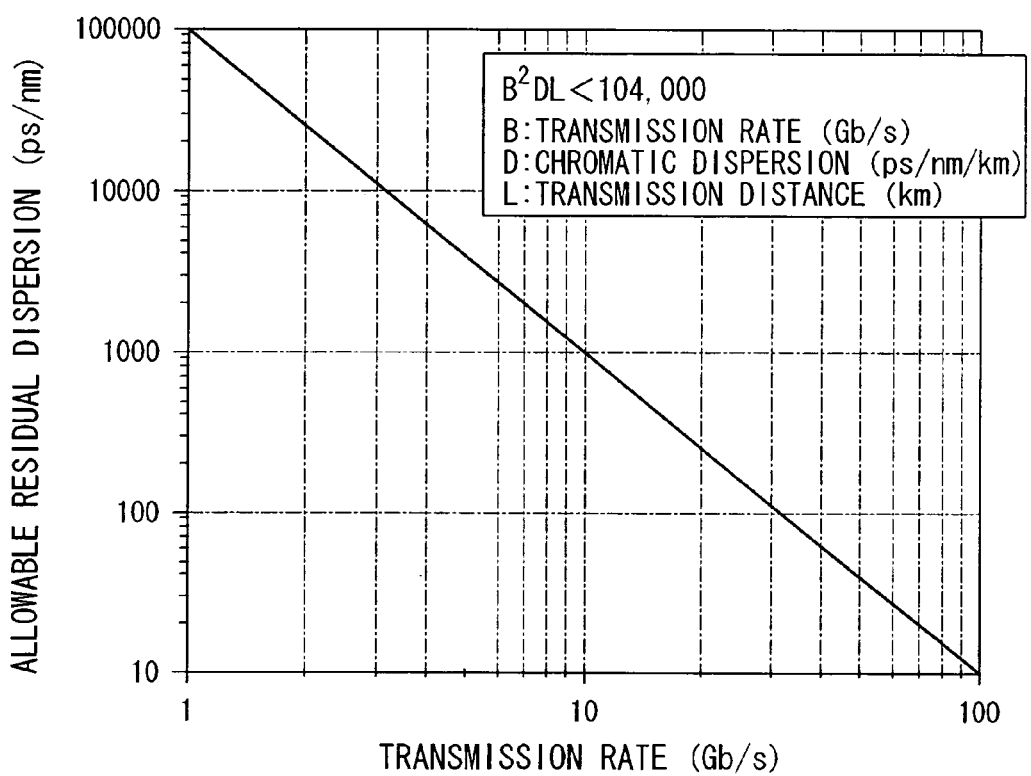
FIG. 1 is a graph showing a relationship between transmission rate and residual dispersion.
Figure 2:
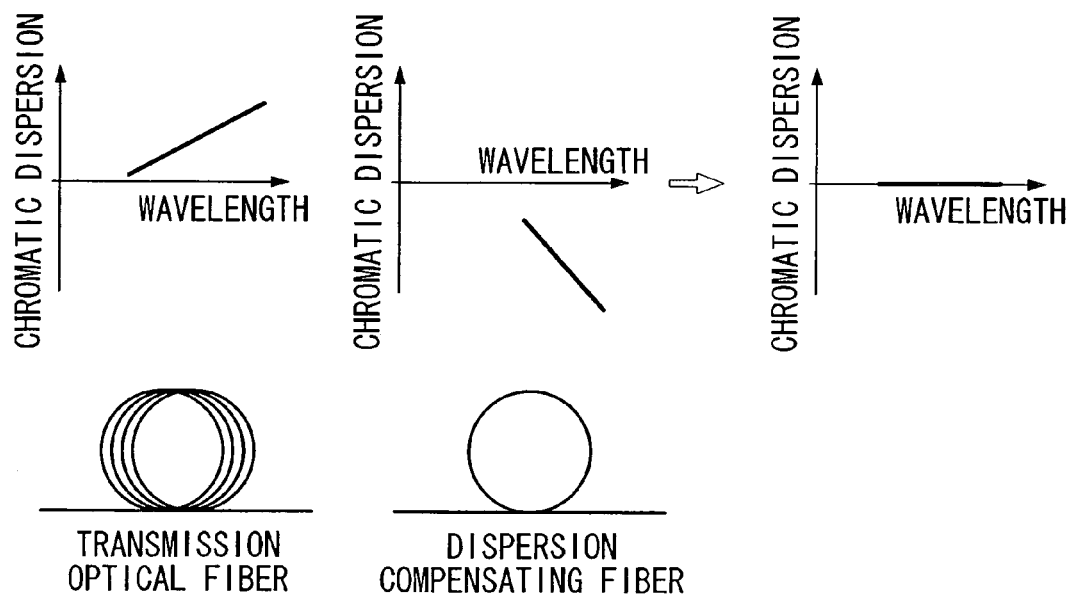
FIG. 2 is a schematic diagram illustrating the basic concept of compensation for chromatic dispersion upon an optical fiber transmission line.
Figure 3:
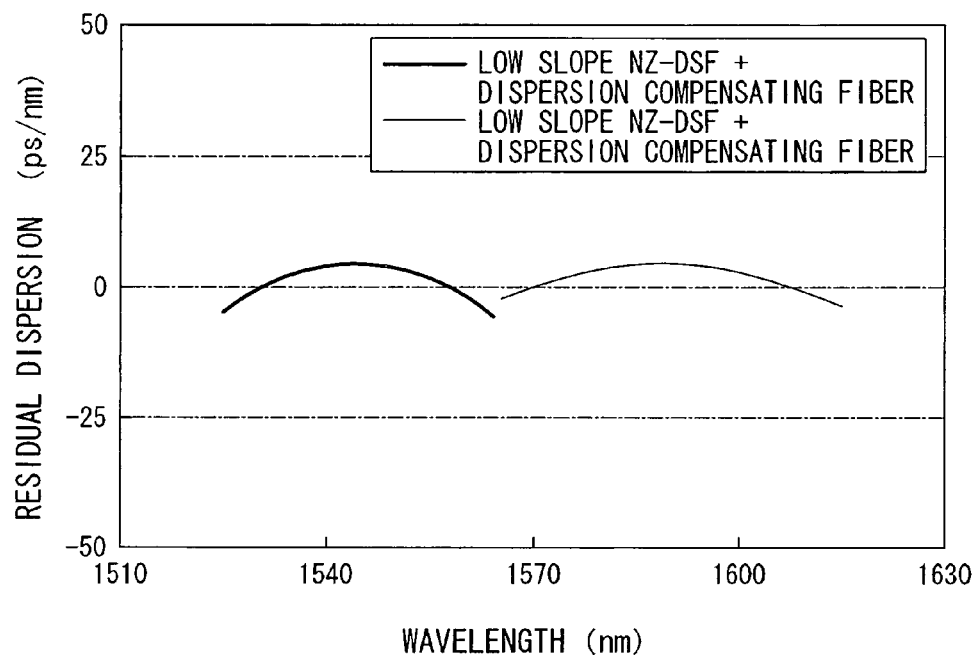
FIG. 3 is a graph showing a residual dispersion characteristic after a low dispersion slope type NZ-DSF has been compensated with an SC-DCF module.
Figure 4:
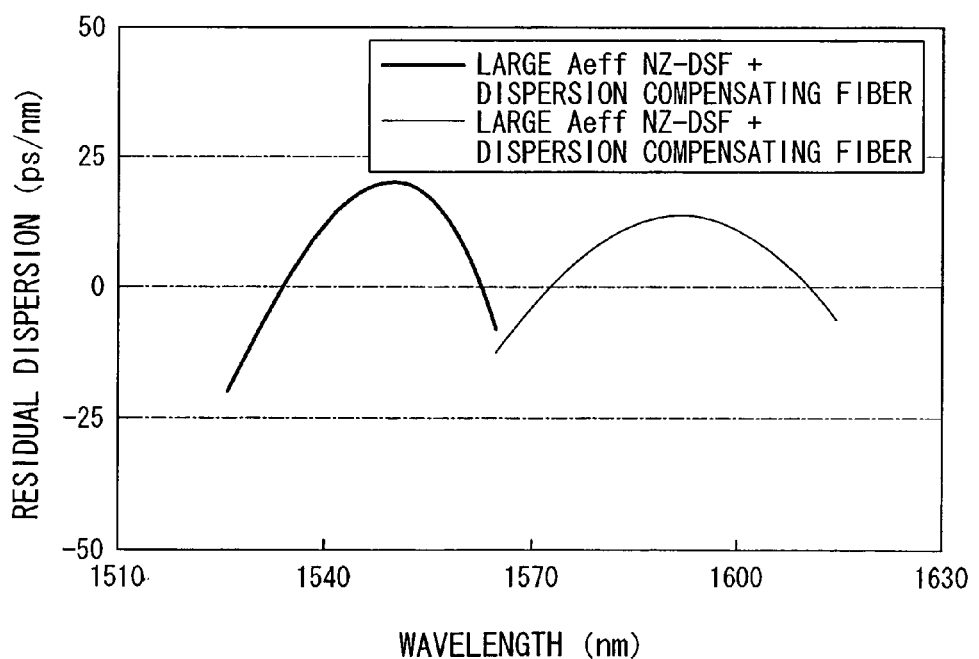
FIG. 4 is a graph showing a residual dispersion characteristic after a high dispersion slope type NZ-DSF has been compensated with an SC-DCF module.

An SC-DCF module (referred to as "Module A") which was fabricated by using Fiber A. The residual dispersion characteristics, when the accumulated chromatic dispersion of an NZ-DSF which was 80 km long was compensated by using Module A, was evaluated. The results were shown by the thick line in FIG. 4.

Example 1

SC-DCFs B, C, and D (hereinafter simply referred to as "Fiber B," "Fiber C," and "Fiber D," respectively) having refractive index profiles as shown in FIG. 5 were fabricated by the well-known VAD method or the MCVD method or the like. Fibers B, C, and D were fabricated so that Δ1, Δ2, Δ3, Δ4, b/a, c/b, d/c, and the core radius "d" had the values listed in Table 3.

Figure 7:
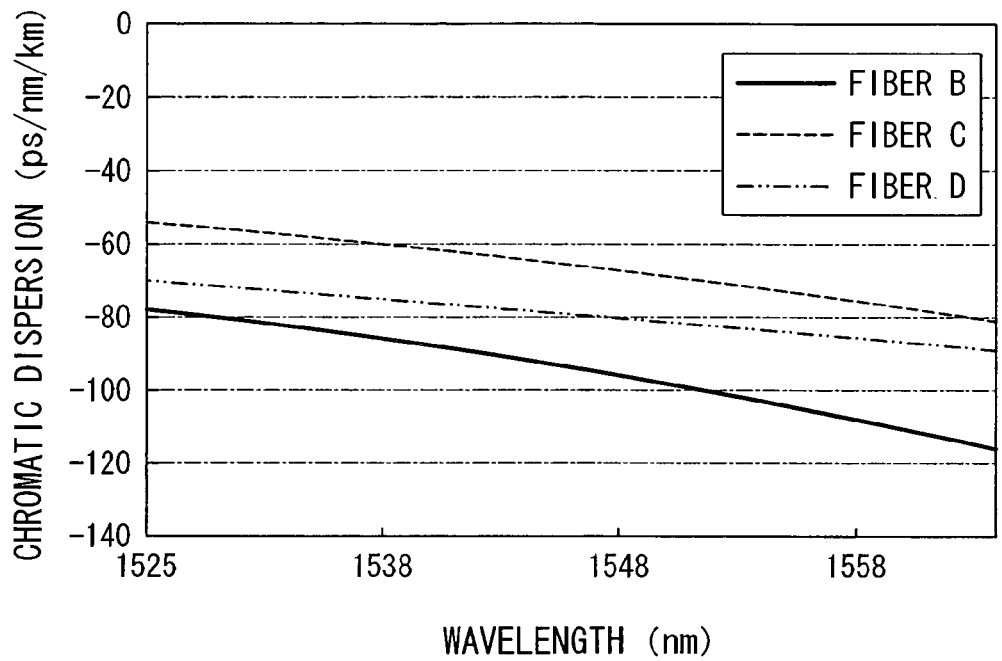
FIG. 7 is a graph showing the chromatic dispersion characteristic of SC-DCFs B, C, and D which are used in an exemplary embodiment of the invention.
Figure 8:
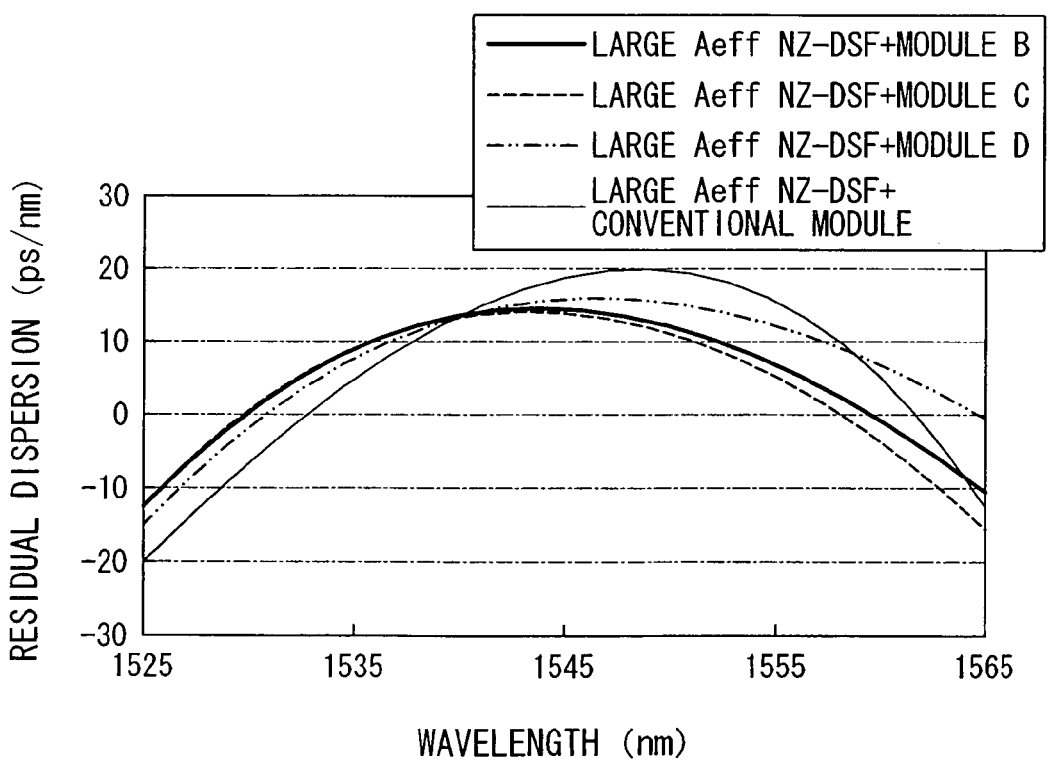
FIG. 8 is a graph showing the residual dispersion characteristic when the accumulated chromatic dispersion of an 80 km long large effective area NZ-DSF has been compensated by using these SC-DCF modules B, C, and D which are used in an exemplary embodiment of the present invention.

The optical properties of Fibers B, C, and D are listed in Table 4. Furthermore, the chromatic dispersion characteristic of Fibers B, C, and D are shown in FIG. 7. SC-DCF modules (hereinafter referred to as "Module B." "Module C," and "Module D," respectively) were fabricated by connecting an S-SMF to Fibers B, C, and D. The residual dispersion characteristics, when the accumulated chromatic dispersion of a large effective area NZ-DSF which was 80 km long was compensated by using Modules B, C, and D, were evaluated. The results are listed in Table 5 and FIG. 8.

TABLE 3

| No | Δ1 [%] | Δ2 [%] | Δ3 [%] | Δ4 [%] | b/a | c/b | d/c | d [μm] |
|---|---|---|---|---|---|---|---|---|
| Fiber B | 1.49 | −0.77 | 0.43 | −0.10 | 2.5 | 1.4 | 1.6 | 13.2 |
| Fiber C | 1.47 | −0.75 | 0.43 | −0.10 | 2.5 | 1.4 | 1.6 | 13.4 |
| Fiber D | 1.53 | −0.57 | 0.34 | −0.05 | 2.6 | 1.4 | 1.6 | 11.8 |

TABLE 4

| No | λ [μm] | CD [ps/nm/km] | Trans. Loss [dB/km] | DS [ps/nm²/km] | FOM [ps/nm/dB] | RDS [nm⁻¹] | $A_{eff}$ [μm²] | Bending Loss [dB/m, 2R = 20 mm] | PMD [ps/√km] |
|---|---|---|---|---|---|---|---|---|---|
| Fiber B | 1.55 | −98.7 | 0.37 | −1.13 | 267 | 0.011 | 18 | 0.8 | 0.08 |
| Fiber C | 1.55 | −68.9 | 0.35 | −0.79 | 197 | 0.012 | 17 | 1.2 | 0.10 |
| Fiber D | 1.55 | −80.6 | 0.34 | −0.53 | 237 | 0.0066 | 18 | 0.3 | 0.08 |

TABLE 5

| No | λ [μm] | Total CD [ps/nm] | RDS [nm⁻¹] | DCF Length [km] | Loss [dB] | S-SMF Length [km] | Max. Residual Diff. [ps/nm] | Length of Fiber per −100 ps/nm [km] | Loss per −100 ps/nm [dB] |
|---|---|---|---|---|---|---|---|---|---|
| Module B | 1.55 | −324 | 0.024 | 8.1 | 9.1 | 28.0 | 27 | 11.1 | 2.8 |
| Module C | 1.55 | −325 | 0.024 | 11.6 | 10.1 | 27.8 | 29 | 12.2 | 3.1 |
| Module D | 1.55 | −321 | 0.023 | 23.4 | 26.2 | 91.7 | 31 | 35.9 | 8.2 |

The maximum residual dispersion differences for each of these bands are 27 ps/nm for Module B, 29 ps/nm for Module C and, 31 ps/nm for Module D, respectively; and, when these are converted into values per km of the transmission optical fiber, they yield respective values of 0.34 ps/nm/km, 0.37 ps/nm/km, and 0.39 ps/nm/km, respectively. Thus, when a conventional module was used (less than or equal to 40 ps/nm at maximum, and, when converted per km, 0.5 ps/nm/km), the SC-DCF modules could reduce the maximum residual dispersion difference to 67.5%, 72.5%, and 77.5%, respectively, with respect to the residual dispersion characteristic.

As a result, it was made possible, by using Modules B, C, and D for 40 Gb/sec transmission, to extend the possible transmission distances with single dispersion compensation to 384 km, 358 km, and 336 km, respectively.

The maximum residual dispersion differences in these bands was, at a maximum, 30 ps/nm.

If, for example, the residual dispersion tolerance which is allowable for 40 Gbit/sec transmission is assumed to be 65 ps/nm, then there remains a wavelength range for which dispersion compensation was required every 173 km. Due to this, the number of times of dispersion compensation is increased, and the structure of the optical fiber transmission line becomes complicated, which is not desirable.

TABLE 6

| No | Δ1 [%] | Δ2 [%] | Δ3 [%] | Δ4 [%] | b/a | c/b | d/c | d [μm] |
|---|---|---|---|---|---|---|---|---|
| Fiber E | 1.71 | −0.87 | 0.44 | −0.12 | 2.5 | 1.5 | 1.6 | 13.2 |

TABLE 7

| No | λ [μm] | CD [ps/nm/km] | Trans. Loss [dB/km] | DS [ps/nm²/km] | FOM [ps/nm/dB] | RDS [nm⁻¹] | $A_{eff}$ [μm²] | Bending Loss [dB/m, 2R = 20 mm] | PMD [ps/√km] |
|---|---|---|---|---|---|---|---|---|---|
| Fiber E | 1.59 | −74 | 0.41 | −0.81 | 180 | 0.011 | 16 | 0.8 | 0.09 |

Comparative Example 2

An SC-DCF E (hereinafter simply referred to as "Fiber E") having a refractive index profile as shown in FIG. 5 was fabricated by the VAD method or the MCVD method or the like. Fiber E was fabricated so that Δ1, Δ2, Δ3, Δ4, b/a, c/b, d/c, and the core radius "d" had the values listed in Table 6.

Figure 9:
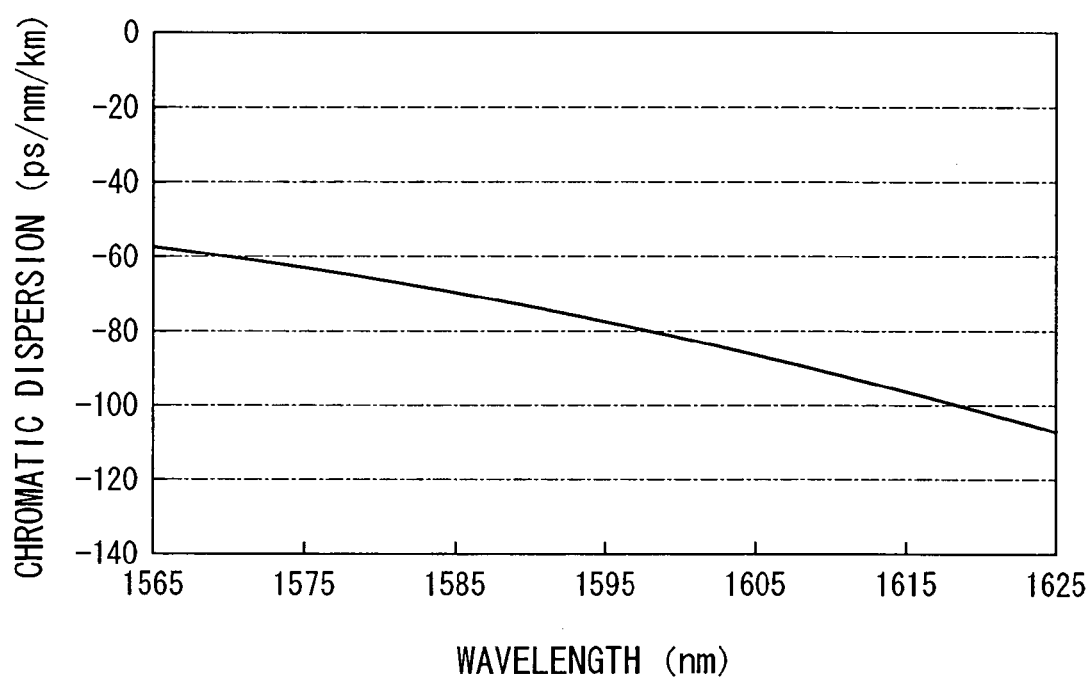
FIG. 9 is a graph showing the chromatic dispersion characteristic of a fiber E which is used in an exemplary embodiment of the invention.

The optical properties of Fiber E are listed in Table 7. Furthermore, the chromatic dispersion characteristic of Fiber E is shown in FIG. 9.

An SC-DCF module (referred to as "Module E") which was fabricated by using Fiber E. The residual dispersion characteristics, when the accumulated chromatic dispersion of an NZ-DSF which was 80 km long was compensated by using Module D, were evaluated. The results were shown by the thin line in FIG. 4.

Example 2

SC-DCFs F, G, and H (hereinafter simply referred to as "Fibers F," "Fiber G," and "Fiber H," respectively) having refractive index profiles as shown in FIG. 5 were fabricated by the VAD method or the MCVD method or the like. Fibers F, G, and H were fabricated so that Δ1, Δ2, Δ3, Δ4, b/a, c/b, d/c, and the core radius "d" had the values listed in Table 8.

Figure 10:
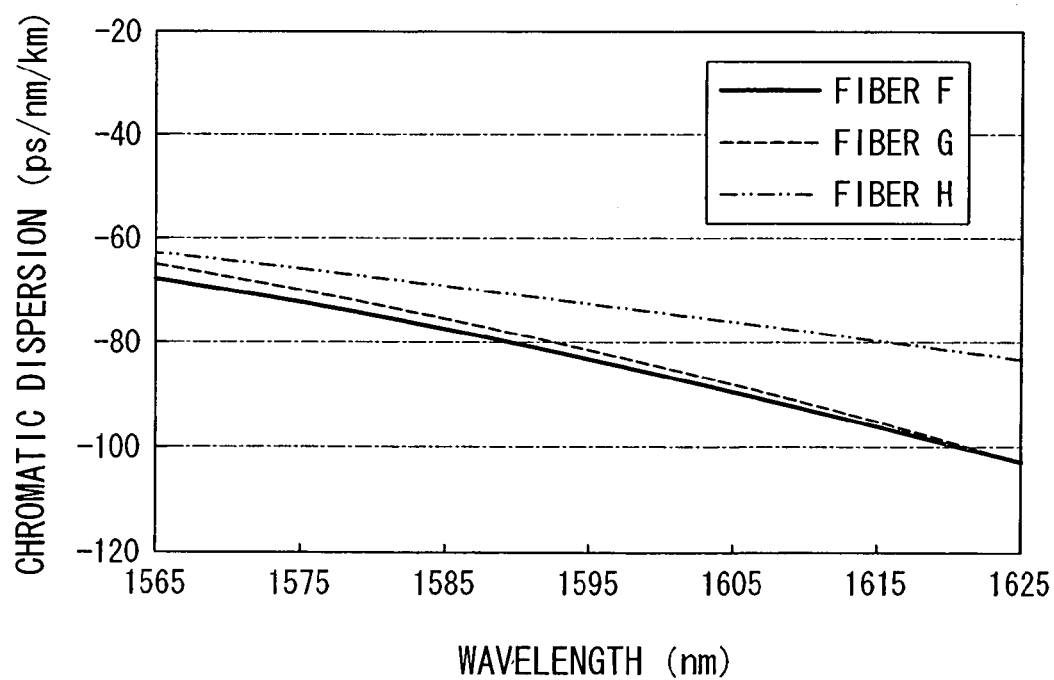
FIG. 10 is a graph showing the chromatic dispersion characteristic of SC-DCFs F, G, and H which are used in an exemplary embodiment of the invention.
Figure 11:
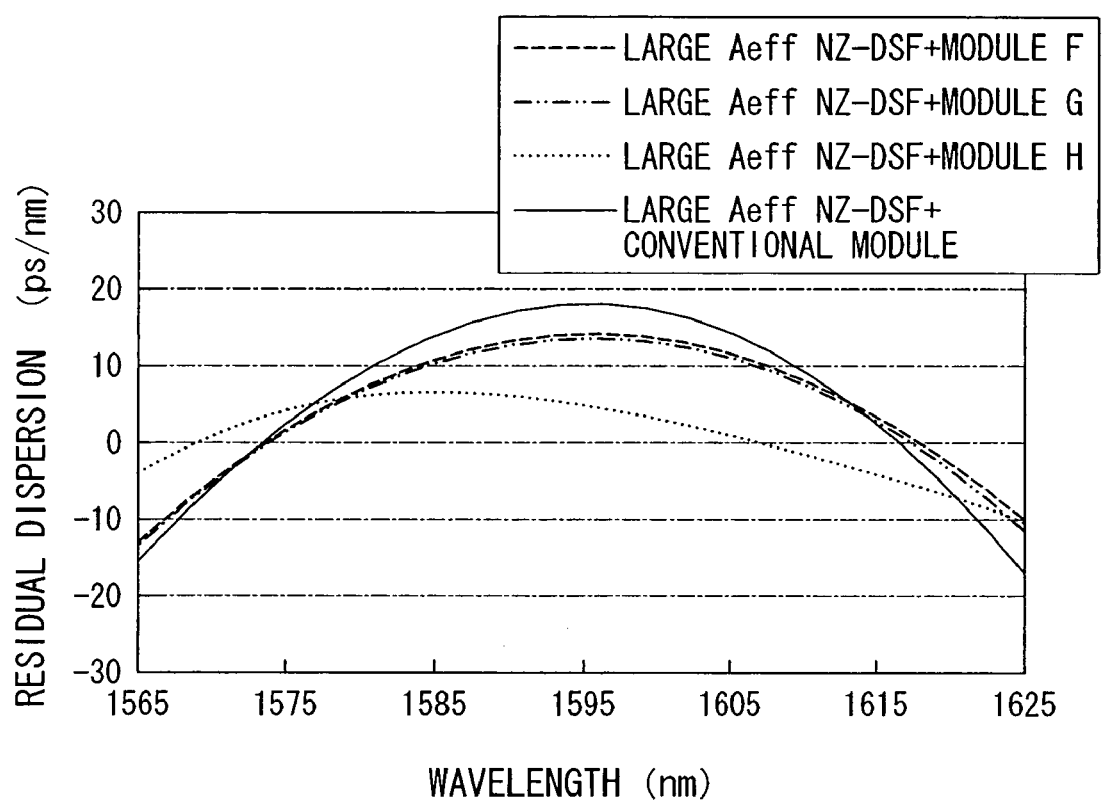
FIG. 11 is a graph showing the residual dispersion characteristic when the accumulated chromatic dispersion of a 80 km long large effective area NZ-DSF has been compensated by using these SC-DCF modules F, G, and H which are used in an exemplary embodiment of the invention.

The optical properties of Fibers F, G, and H are listed in Table 9. Furthermore, the chromatic dispersion characteristic of Fibers F, G, and H are shown in FIG. 10. SC-DCF modules (hereinafter referred to as "Module F," "Module G," and "Module H," respectively) were fabricated by connecting an S-SMF to Fibers F, G, and H. The residual dispersion characteristics, when the accumulated chromatic dispersion of a large effective area NZ-DSF which was 80 km long was compensated by using Modules F, G, and H, were evaluated. The results are listed in Table 10 and FIG. 11.

TABLE 8

| No | Δ1 [%] | Δ2 [%] | Δ3 [%] | Δ4 [%] | b/a | c/b | d/c | d [μm] |
|---|---|---|---|---|---|---|---|---|
| Fiber F | 1.69 | −0.73 | 0.41 | −0.08 | 2.3 | 1.5 | 1.6 | 11.7 |
| Fiber G | 1.69 | −0.73 | 0.41 | −0.08 | 2.3 | 1.5 | 1.6 | 11.7 |
| Fiber H | 1.72 | −0.63 | 0.41 | −0.11 | 2.5 | 1.5 | 1.6 | 11.4 |

TABLE 9

| No | λ [μm] | CD [ps/nm/km] | Trans. Loss [dB/km] | DS [ps/nm²/km] | FOM [ps/nm/dB] | RDS [nm⁻¹] | $A_{eff}$ [μm²] | Bending Loss [dB/m, 2R = 20 mm] | PMD [ps/√km] |
|---|---|---|---|---|---|---|---|---|---|
| Fiber F | 1.59 | −80.5 | 0.35 | −0.56 | 230 | 0.0069 | 17 | 0.9 | 0.12 |
| Fiber G | 1.59 | −78.3 | 0.35 | −0.58 | 224 | 0.0074 | 17 | 1.2 | 0.11 |
| Fiber H | 1.59 | −70.8 | 0.33 | −0.34 | 215 | 0.0048 | 18 | 0.7 | 0.06 |

TABLE 10

| No | λ [μm] | Total CD [ps/nm] | RDS [nm⁻¹] | DCF Length [km] | Loss [dB] | S-SMF Length [km] | Max. Residual Diff. [ps/nm] | Length of Fiber per −100 ps/nm [km] | Loss per −100 ps/nm [dB] |
|---|---|---|---|---|---|---|---|---|---|
| Module F | 1.59 | −595 | 0.011 | 14.5 | 11.5 | 29.6 | 28 | 7.4 | 1.9 |
| Module G | 1.59 | −596 | 0.011 | 13.4 | 10.0 | 23.5 | 26 | 6.2 | 1.7 |
| Module H | 1.59 | −602 | 0.012 | 38.9 | 34.8 | 111.2 | 15 | 24.9 | 5.8 |

The maximum residual dispersion differences for each of these bands are 28 ps/nm for Module F, 26 ps/nm for Module G and, 15 ps/nm for Module H, respectively; and, when these are converted into values per km of the transmission optical fiber, they yield respective values of 0.35 ps/nm/km, 0.33 ps/nm/km, and 0.19 ps/nm/km, respectively. Thus, when a conventional module was used (less than or equal to 30 ps/nm at maximum, and, when converted per km, 0.38 ps/nm/km), the SC-DCF modules could reduce the maximum residual dispersion difference to 92%, 87%, and 50%, respectively, with respect to the residual dispersion characteristic.

As a result, it was made possible, by using Modules F, G, and H for 40 Gb/sec transmission, to extend the possible transmission distances with single dispersion compensation to 372 km, 400 km, and 694 km, respectively.

While exemplary embodiments of the invention have been described and illustrated above, it should be understood that these are exemplary embodiments of the invention and are not to be considered as limiting. Additions, omissions, substitutions, and other modifications can be made without departing from the spirit or scope of the present invention. Accordingly, the invention is not to be considered as being limited by the foregoing description.

What is claimed is:

1. A dispersion compensating fiber module adapted to be connected to an existing optical fiber to suppress residual dispersion of the existing optical fiber to a low level, said dispersion compensating fiber module comprising:

a dispersion compensating fiber which exhibits, at a wavelength of 1.55 μm, a chromatic dispersion and a dispersion slope of negative values, and a relative dispersion slope of between 0.006 nm⁻¹ and 0.016 nm⁻¹; and an optical fiber which exhibits, at a wavelength of 1.55 μm, a chromatic dispersion and a dispersion slope of positive values, and a relative dispersion slope of between 0.0028 nm⁻¹ and 0.0036 nm⁻¹, wherein the dispersion compensating fiber module exhibits, at a wavelength of 1.55 μm, a relative dispersion slope of between 0.016 nm⁻¹ and 0.026 nm⁻¹; and, wherein when said dispersion compensating fiber module is connected to the existing optical fiber, a maximum residual dispersion difference of less than or equal to 0.4 ps/nm/km is exhibited in a wavelength range between 1.525 μm and 1.565 μm.

2. A dispersion compensating fiber module according to claim 1, wherein a chromatic dispersion of between +2 and +6 ps/nm/km, a dispersion slope of between +0.075 ps/nm²/km and +0.095 ps/nm²/km relative dispersion slope of between 0.016 nm⁻¹ and 0.024 nm⁻¹ are exhibited at a wavelength of 1.55 μm, as an effect of said dispersion compensating fiber module upon the existing optical fiber.

3. A dispersion compensating fiber module according to claim 1, wherein a total length of the fibers in the dispersion compensating fiber module per −100 ps/nm is less than or equal to 40 km.

4. A dispersion compensating fiber module according to claim 1, further comprising a reel, wherein the dispersion compensating fiber is wound about the reel.

5. A dispersion compensating fiber module according to claim 4, wherein a total length of the fibers in the dispersion compensating fiber module per −100 ps/nm is less than or equal to 30 km.

6. A dispersion compensating fiber module according to claim 1, wherein the dispersion compensating fiber module is used as a Raman amplifying medium;

wherein the dispersion compensating fiber exhibits a chromatic dispersion and a dispersion slope of negative values at a wavelength of at least one of a 1.55 μm band and a 1.59 μm band; and, wherein said dispersion compensating fiber is disposed at the Raman excitation optical input side within the dispersion compensating fiber module.

7. An optical fiber transmission line, comprising a dispersion compensating fiber module according to claim 1, and a transmission optical fiber which is connected to the dispersion compensating fiber module.

8. A dispersion compensating fiber module adapted to be connected to an existing optical fiber to suppress residual dispersion of the existing optical fiber to a low level, said dispersion compensating fiber module comprising:
- a dispersion compensating fiber which exhibits, at a wavelength of 1.59 μm, a chromatic dispersion and a dispersion slope of negative values, and a relative dispersion slope of between 0.005 $nm^{-1}$ and 0.01 $nm^{-1}$;
- an optical fiber which exhibits, at a wavelength of 1.59 μm, a chromatic dispersion and a dispersion slope of positive values, and a relative dispersion slope of between 0.0026 $nm^{-1}$ and 0.0034 $nm^{-1}$;
- wherein the dispersion compensating fiber module exhibits at a wavelength of 1.59 μm, a relative dispersion slope of between 0.008 $nm^{-1}$ and 0.014 $nm^{-1}$; and
- wherein when the dispersion compensating fiber module is connected to the existing optical fiber, maximum residual dispersion difference of less than or equal to 0.3 ps/nm/km is exhibited in a wavelength range between 1.565 μm and 1.625 μm.

9. A dispersion compensating fiber module according to claim 8, wherein a chromatic dispersion of between +6 and +10 ps/nm/km, a dispersion slope of between +0.075 $ps/nm^2/km$ and +0.095 $ps/nm^2/km$, and a relative dispersion slope of between 0.008 $nm^{-1}$ and 0.014 $nm^{-1}$ are exhibited at a wavelength of 1.59 μm, as an effect of said dispersion compensating fiber module upon the existing optical fiber.

10. A dispersion compensating fiber module according to claim 8, further comprising a reel, wherein the dispersion compensating fiber is wound about the reel.

11. A dispersion compensating fiber module according to claim 8, wherein the dispersion compensating fiber module is used as a Raman amplifying medium;
- wherein the dispersion compensating fiber exhibits a chromatic dispersion and a dispersion slope of negative values at a wavelength of at least one of a 1.55 μm band and a 1.59 μm band; and,
- wherein said dispersion compensating fiber is disposed at the Raman excitation optical input side within the dispersion compensating fiber module.

* * * * *